United States Patent [19]

Vanderzee

[11] 4,269,649
[45] May 26, 1981

[54] SECOND STAGE TIRE BUILDING DRUM AND METHOD FOR THE OPERATION THEREOF

[75] Inventor: Robert S. Vanderzee, Akron, Ohio

[73] Assignee: The Steelastic Company, Akron, Ohio

[21] Appl. No.: 970,665

[22] Filed: Dec. 18, 1978

[51] Int. Cl.³ .......................................... B29H 17/26
[52] U.S. Cl. .................................. 156/416; 156/126; 156/132; 156/398
[58] Field of Search ............... 156/126, 128 R, 128 N, 156/405 R, 414, 415, 416

[56] References Cited

U.S. PATENT DOCUMENTS

| | | | |
|---|---|---|---|
| 2,084,009 | 6/1937 | Sohl | 156/416 |
| 2,814,330 | 11/1957 | Vanzo et al. | 156/416 |
| 2,814,331 | 11/1957 | Vanzo et al. | 156/416 |
| 3,053,308 | 9/1962 | Vanzo et al. | 156/415 |
| 3,134,079 | 5/1964 | Giletta et al. | 156/415 |
| 3,402,090 | 9/1968 | Henley | 156/126 |
| 3,873,397 | 3/1975 | Leblond et al. | 156/401 |
| 3,929,540 | 12/1975 | Held et al. | 156/416 |
| 3,945,866 | 3/1976 | Rudder et al. | 156/126 |
| 3,947,312 | 3/1976 | Henley | 156/405 |
| 3,950,201 | 4/1976 | McEvoy et al. | 156/126 |

FOREIGN PATENT DOCUMENTS 1375555 11/1974 United Kingdom .................... 156/416

Primary Examiner—John E. Kittle
Attorney, Agent, or Firm—Hamilton, Renner & Kenner

[57] ABSTRACT

A second stage building drum assembly (10) mounted on a rotatable drive shaft (15) for the application of belts and the like to a carcass includes a drum (12) rotatably carried by the drive shaft (15) for mounting a carcass (143) and first and second belt guide ply rings (13 and 14) reciprocably movable with respect to the drum. Further provided are means (30) for reciprocably moving one side (32) of the drum (12) with respect to the other (33) and, means (22, 23 and 96) for moving the first and second belt guide ply rings into engagement with the drum (12) for the application of at least one belt (154) to a carcass (143) mounted thereon. A method is also provided for the operation of the assembly and includes the steps of mounting a carcass (143) on the rotatable building drum (12), moving one side (32) of the drum (12) toward the other side (33), inflating the carcass (143), actuating bead centering clamps (91 and 135), and moving the first and second belt guide ply rings (13 and 14) into engagement with the drum (12) for the application of a belt (154) to the carcass (143) carried thereon.

7 Claims, 6 Drawing Figures

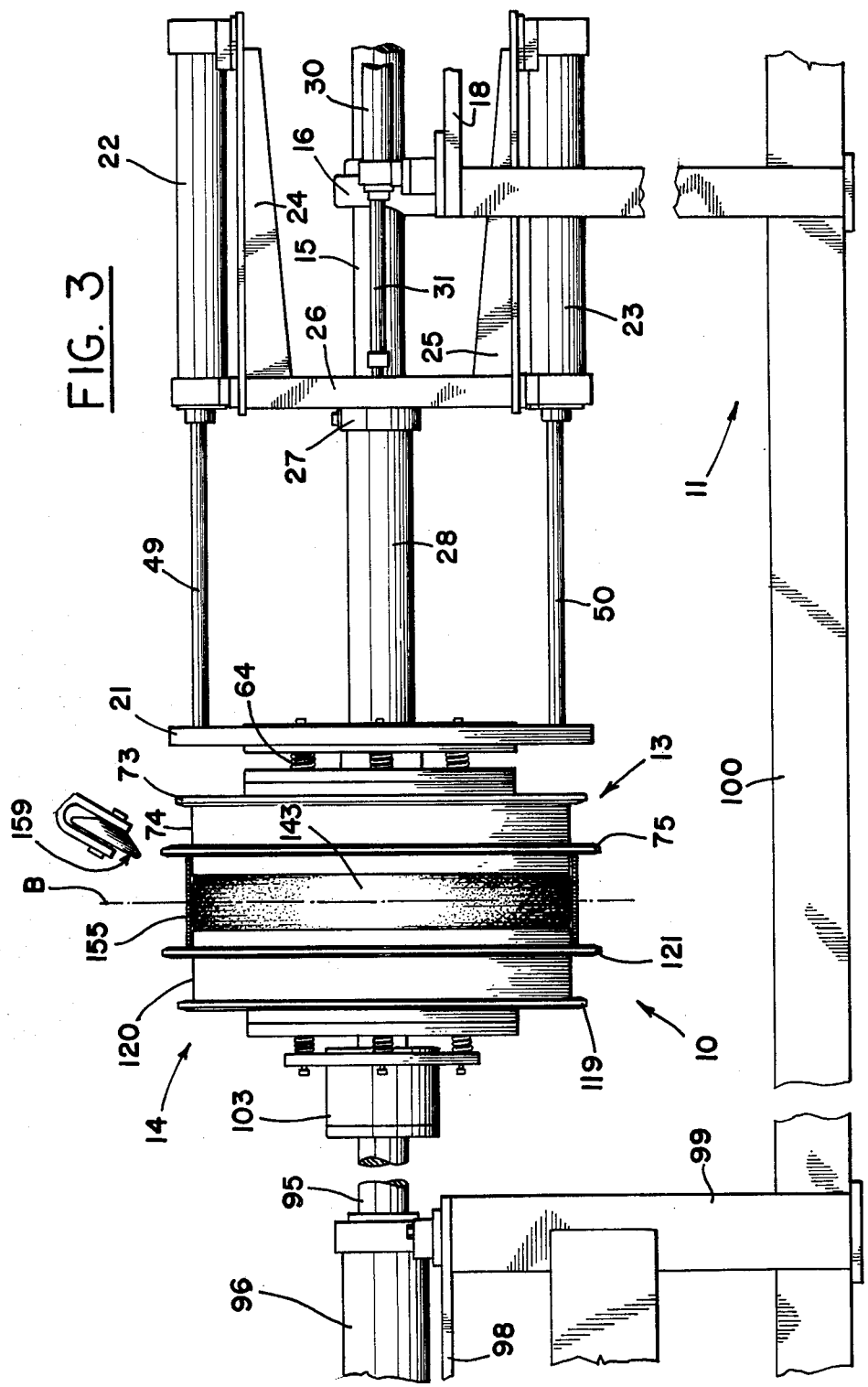

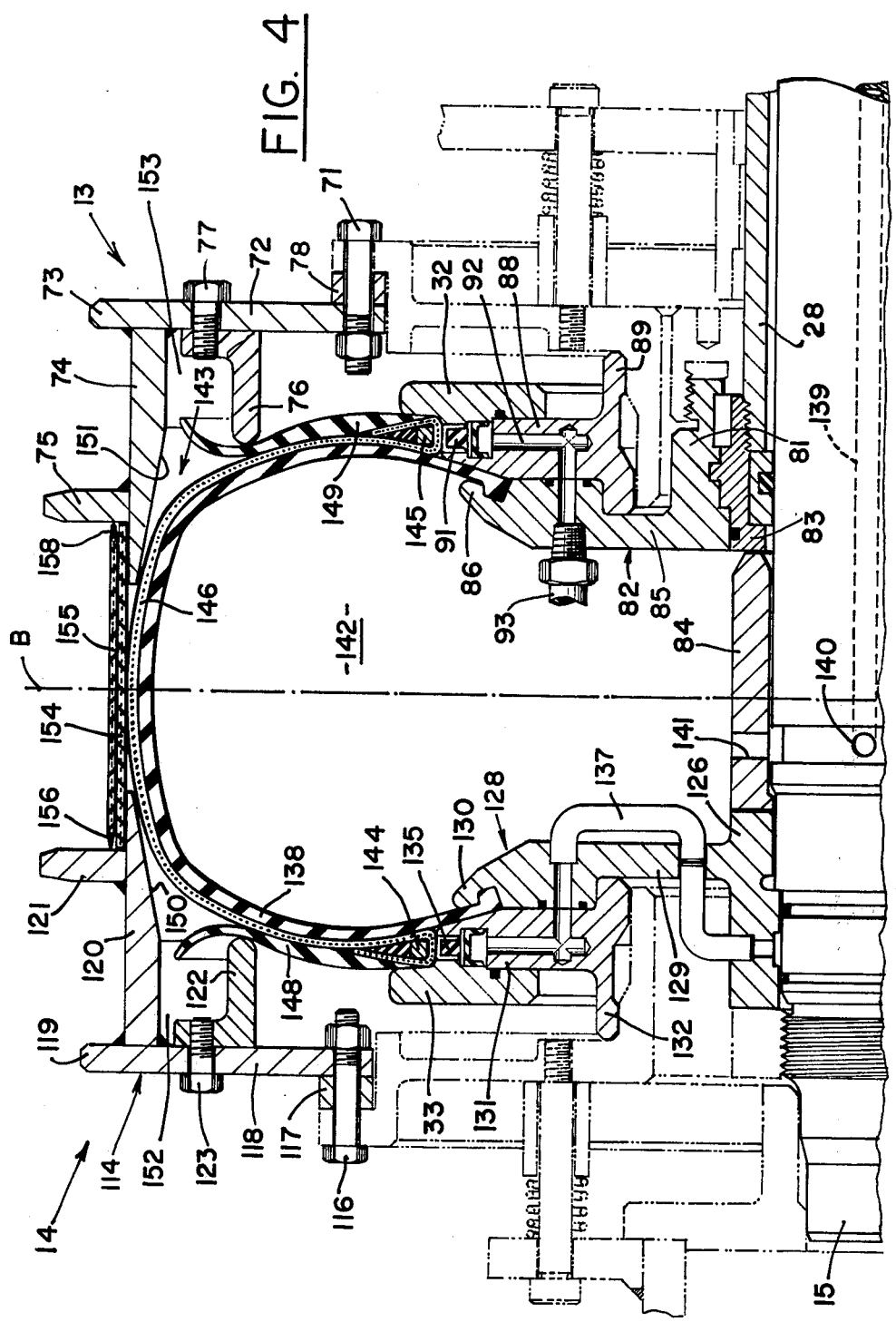

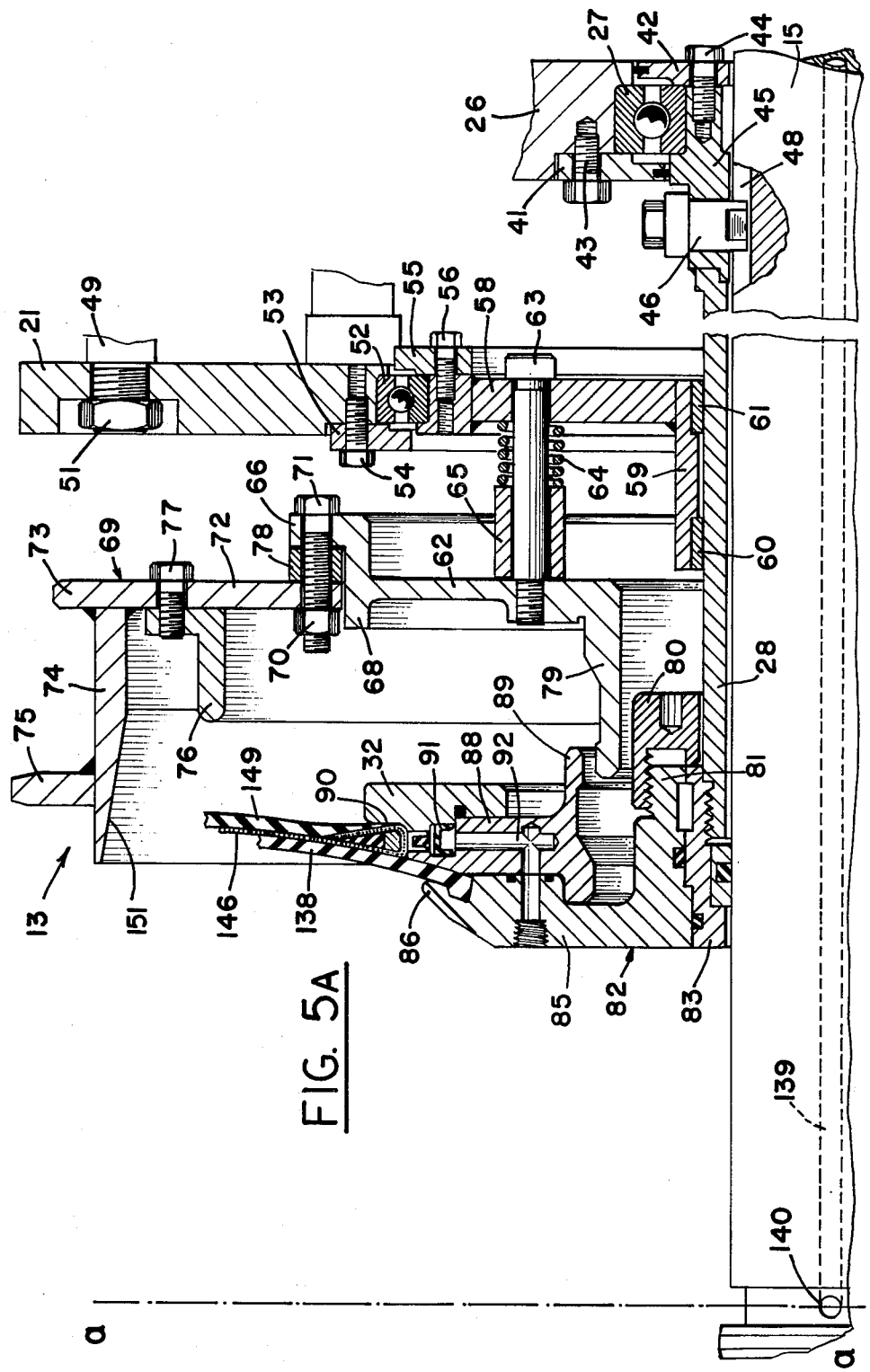

SECOND STAGE TIRE BUILDING DRUM AND METHOD FOR THE OPERATION THEREOF

TECHNICAL FIELD

The present invention relates to a second stage building drum assembly for the application of one or more relatively inextensible circumferential belts and the like to a radial tire carcass, and the method of operation thereof.

In the construction of radial tires it is customary to locate one or more reinforced belts below the tread which belts control the shape of the tire and give it strength during inflation and use. To manufacture such tires, a first stage building drum is employed on which the carcass plies, beads, sidewall strips and the like are assembled to form a tire carcass. The product therefrom is cylindrical and has a diameter approximately equal to that of the beads. This stage of the manufacture can be performed on conventional tire building machines or on the first stage tire building drum described in Ser. No. 970,570, filed Dec. 18, 1978 and owned by The Steelastic Company, the Assignee of record herein.

To complete the manufacture of the radial tire, the carcass is transferred to a second stage building drum which changes the shape of the carcass from cylindrical to toroidal, the latter, approximately the shape and size of the finished tire. In the toroidal shape, the belts or tread plies are applied to the carcass followed by the tread. Various stitching operations are performed and the resulting product is then removed for ultimate transfer to a curing press.

BACKGROUND ART

Building tires in the foregoing manner is not exceedingly difficult, however, if not done with great care and upon accurate equipment, premature problems may develop which can lead to unsatisfactory operation of the resultant tire or possibly failure during use. With particular respect to second stage operations, accurate belt (tread ply) placement in relation to the centerline of the tire carcass is of the utmost importance in order to eliminate undue wear and/or defects in the tire. One of these defects, known as conicity, occurs when the belt ply is not applied directly over the centerline of the carcass and causes the vehicle upon which the tire is mounted to tend to steer in a circle. As a consequence, the car pulls to one direction and excess adjustment in wheel alignment is necessary to correct the condition. Lateral force variation can also occur if the belt ply is applied on the carcass crooked and will cause the tire to meander left and right during rotation. In addition, premature wear on the tire and undue flexing of the belt can also occur which can give rise to its failure, particularly in steel reinforced belts.

The misplacement of carcass components such as belts (tread plies) can be attributed to carelessness on the part of the operator, faulty equipment and other reasons. Existing equipment has most commonly been made adjustable so that the tire builder can construct more than one size of tire on a given machine. In order to accommodate a variety of component sizes for different tires, the flexibility designed into the machine is often at the expense of rigidity and stability thereof, directly affecting the degree of accuracy with which even the most careful operator can build a tire. Existing tire building equipment has not successfully eliminated the possibility of misadjustment by the operator or maladjustment occasioned by wear of the equipment.

Exemplary apparatus of the foregoing type is depicted in British Pat. No. 1,375,555. This patent as well as U.S. Pat. No. 2,814,330 and 2,814,331 also disclose centering guides which are provided for the accurate placement of belts; however, these are too low to be totally effective in instances where the belts are hurriedly applied or are improperly dimensioned.

A building drum which does not require simultaneous movement of both sides toward the center in order to impart a toroidal shape to the carcass, is described in U.S. Pat. No. 3,929,540. This patent does not provide a satisfactory means by which the belts can be accurately applied to the carcass and thus does not represent a substantial improvement over the prior art.

The British apparatus further typifies the prior art in that the expansion of the tire carcass from cylindrical to toroidal shape is occasioned by simultaneously moving the ends of the drum toward the center. Although such a mechanism is effective for expanding the carcass, eventual mechanical play or wear will lead to maladjustment and if uncorrected, will result in the inaccurate building of the tire or similar article.

DISCLOSURE OF INVENTION

It is therefore an object of the present invention to provide a novel second stage building drum assembly for the construction of radial tires and the like.

It is a further object of the present invention to provide a novel second stage building drum assembly which facilitates the application of belts onto carcasses with improved accuracy.

It is yet another object of the present invention to provide a novel second stage building drum assembly which incorporates features to improve tire uniformity, to speed the building operation and to produce improved tires with consistency and at a lower cost.

It is a further object of the present invention to provide a novel second stage building drum assembly which facilitates fast, simple and accurate adjustments for a given tire size with a minimum of skill being required by the operator or set-up man.

It is still another object of the present invention to provide a novel second stage building drum upon which the set-up to construct a tire is dictated by the mechanical parts of the machine rather than the skill, or lack thereof, of the operator.

It is yet another object of the present invention to provide a novel second stage building drum, the centerline of which is movable during expansion of a carcass mounted thereon from cylindrical to toroidal shape.

It is further another object of the present invention to provide a method for the operation of the second stage building drum assembly described herein.

These and other objects of the present invention, together with the advantages thereof over the prior art, which shall become apparent from the specification that follows, are accomplished by the invention as hereinafter described and claimed.

In general, the second stage building drum assembly of the present invention includes a drum, rotatably carried by the drive shaft of a tire building machine or similar apparatus and first and second belt ply guide rings reciprocably movable with respect to the drum. Also provided are means for reciprocably moving one side of the drum with respect to the other from a first position, for mounting and removal of a carcass, to a second position for expansion of the carcass, and means for moving the first and second belt ply guide rings into engagement with the drum for the application of at least one belt to a carcass mounted thereon.

The operation of the second stage building drum assembly of the present invention includes the steps of mounting a carcass on the rotatable building drum, moving one side of the drum toward the other side thereby decreasing the width of the carcass, inflating the carcass, and moving the first and second belt ply guide rings into engagement with the drum for the application of a belt to the carcass carried thereon. The belts are subsequently stitched to the carcass and the belt ply guide rings are retracted.

BRIEF DESCRIPTION OF DRAWINGS

FIG. 3 is a front-elevation of the second stage building drum assembly of the present invention in the closed position depicting a carcass in the inflated position and the receipt of a belt thereon;

FIG. 4 is a front-elevation partially in section of the upper half of the second stage building drum assembly in closed position;

FIGS. 5A and 5B are contained on two separate sheets and depict, partially in section, the upper half of the building drum assembly just prior to the complete closure thereof for application of the belts and tread plies to the carcass; FIG. 5A including the inboard belt ply guide ring and the mating portion of the building drum to the line a—a; and FIG. 5B including the outboard belt ply guide ring and the mating portion of the building drum from the line a—a.

PREFERRED MODE FOR CARRYING OUT THE INVENTION

Figure 1:
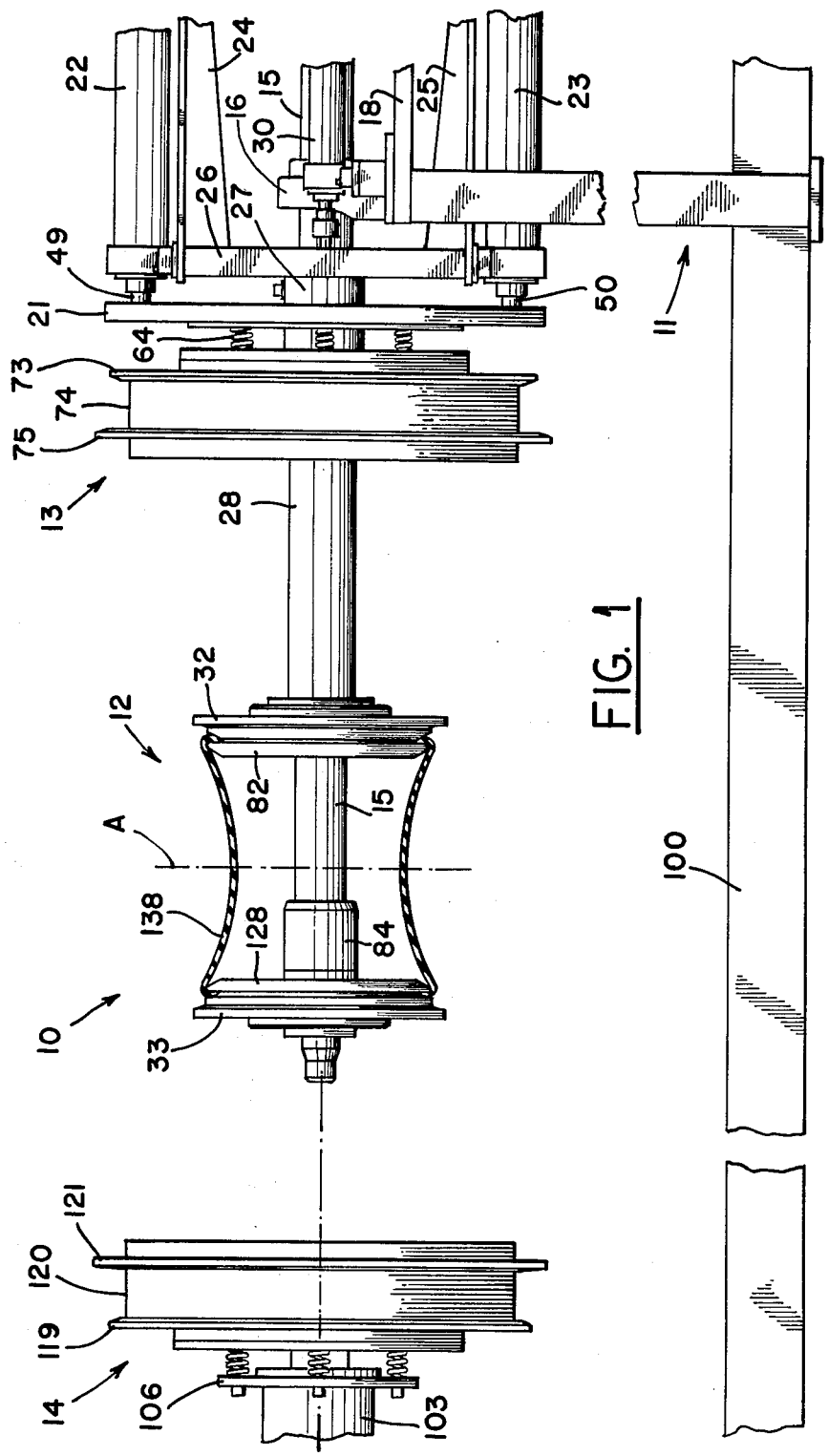
FIG. 1 is a front-elevation of the second stage building drum assembly of the present invention in open position for the receipt of a carcass.

The complete building drum assembly of the present invention is best depicted in FIG. 1, indicated generally by the numeral 10. The assembly 10 is mounted on a frame 11 and includes the drum, generally 12, and inboard and outboard belt ply guide rings, generally 13 and 14 respectively. The drum 12 is affixed to a drive shaft 15, journaled in pillow blocks 16, (only one of which is shown) mounted on bedplate 18 of frame 11, and rotatably driven by a motor (not shown). The motor, drive shaft 15 and associated frame 11 are components of a conventional tire building machine which can be altered as desired to carry the drum assembly 10.

A housing plate 21 is movable along the drive shaft 15 by upper and lower double-acting pneumatic cylinders 22 and 23 respectively, which are mounted on cylinder supports 24 and 25 extending from a vertical support plate 26. Support plate 26, is connected by a thrust bearing 27 to a tube 28 and both are reciprocable along drive shaft 15 by virtue of a pair of double-acting hydraulic cylinders, one of which, 30, is depicted in the drawings, while a second identical cylinder (not shown) is provided on the other side of drive shaft 15. The cylinders 30 are rigidly affixed to bedplate 18 and have their pistons 31 connected to support plate 26. Additional mechanical means (not shown) are provided to prevent rotation of plate 26 relative to base 11.

Figure 2:
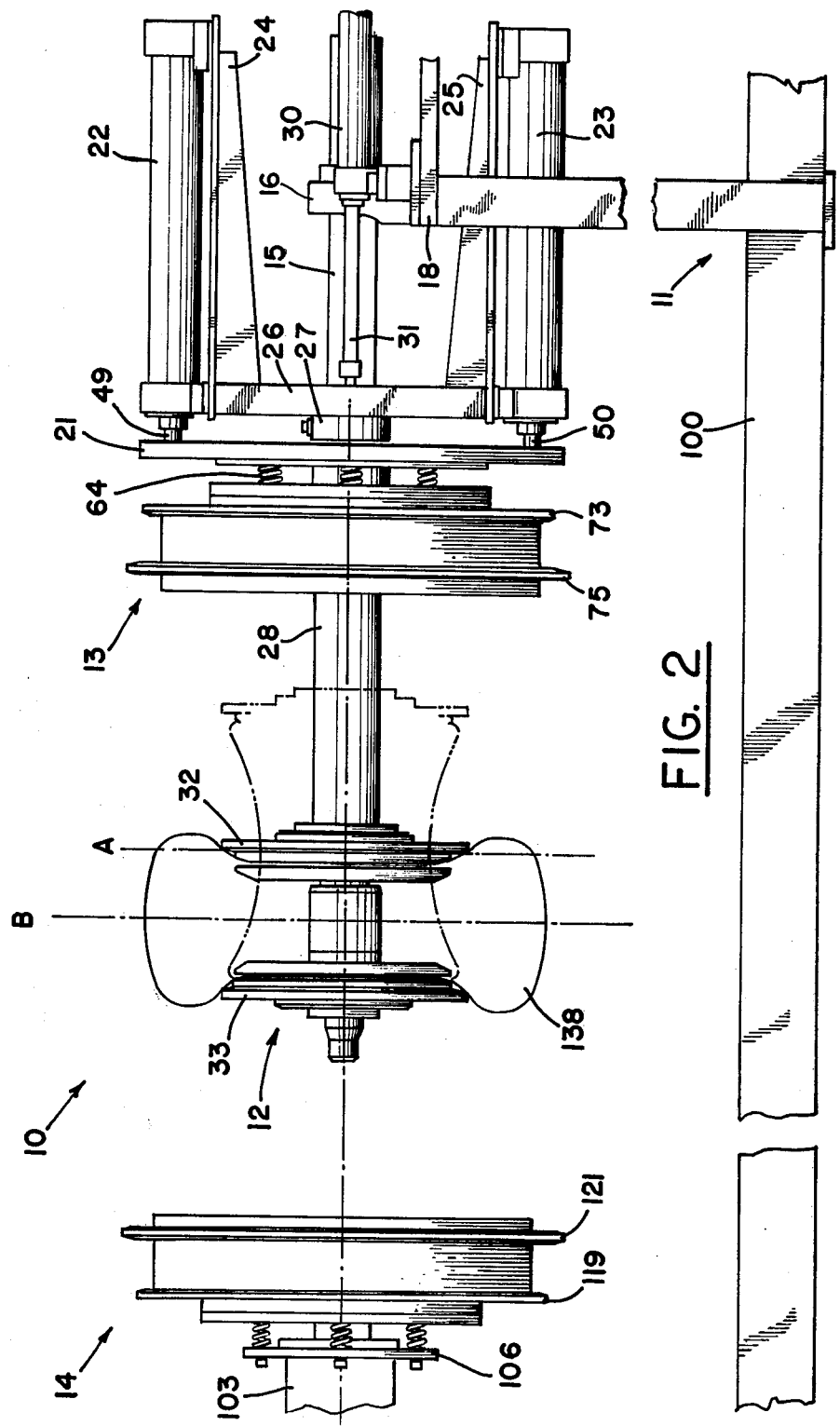
FIG. 2 is a front-elevation of the second stage building drum assembly of the present invention in open position and depicting the drum in the closed position with an inflated bladder thereon.

With reference to FIGS. 1 and 2, it is seen that upon extension of the pistons 31, the support plate 26 inboard guide ring 13 and tube 28 are driven to the left, toward the tail end of the drive shaft 15. This movement causes the closing of the drum assembly 10, during which air is introduced into the drum causing the tire carcass to expand into a toroidal shape. Unlike many existing drums, wherein both side rings of the drum travel equidistantly toward and away from the centerline of the drum, the inboard side ring 32 is movable while the outboard side ring 33 remains stationary. In this manner, the centerline A of the drum 12 moves to the position B when the drum is closed or contracted for expansion of the carcass.

Figure 5B:
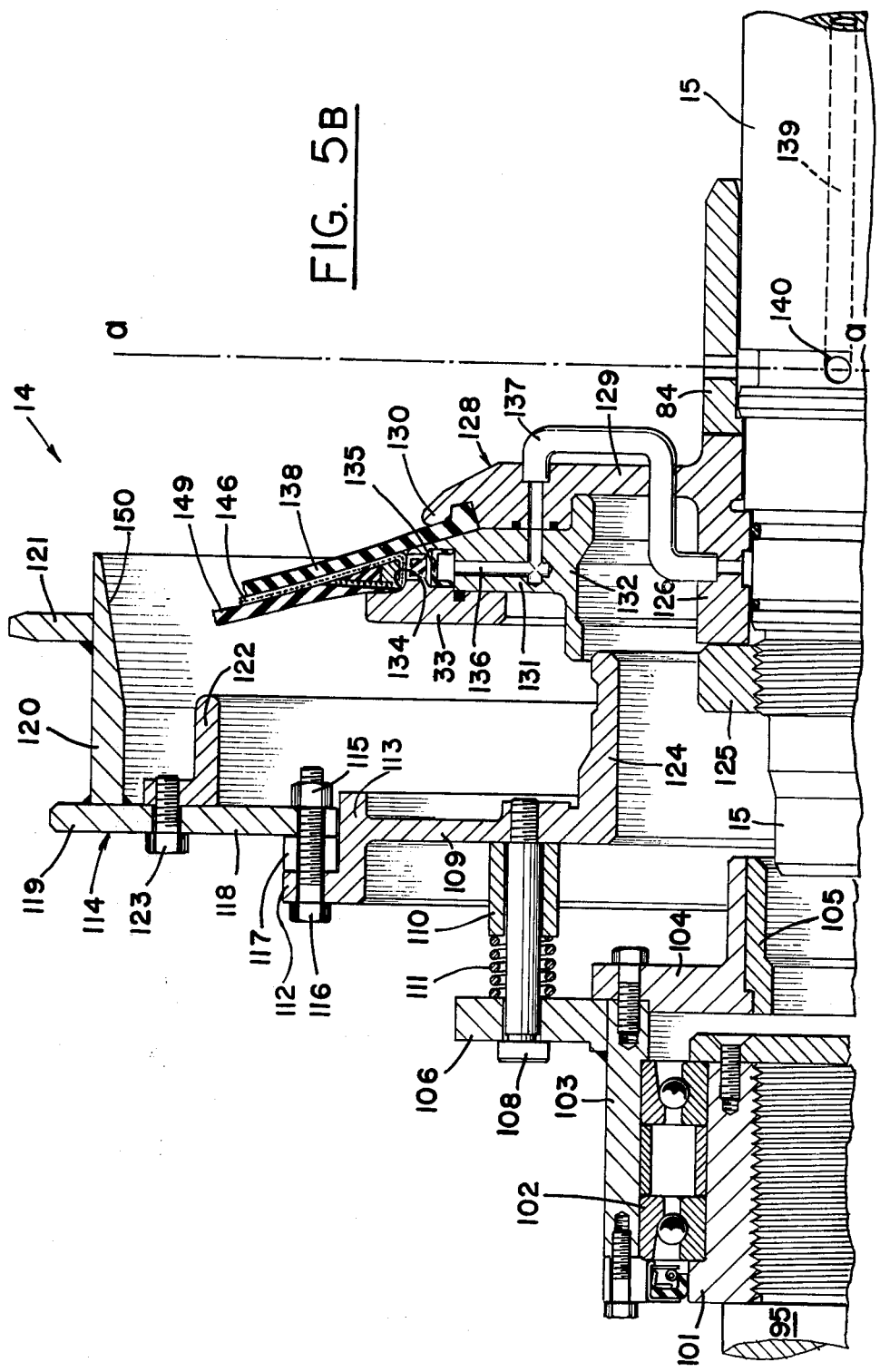

With reference to FIGS. 5A and 5B, the mounting of the drum 12 and inboard and outboard belt ply guide rings 13 and 14 on the drive shaft 15 and movement of each with respect to the others shall be described.

Vertical support plate 26 rests upon the thrust bearing 27 which is held between a pair of bearing caps 41 and 42, cap 41 being fastened with cap screws 43 passing into plate 26, and cap 42 being fastened with cap screws 44 passing into the end of an annular key support 45 which, in turn, is welded or otherwise connected to tube 28. A key 46 is provided in key support 45 and prevents the tube 28 and shaft 15 from rotating relative to each other. The key 46 reciprocates in a longitudinal groove 48 provided in drive shaft 15.

Pistons 49 and 50, from cylinders 22 and 23 respectively, are connected to housing plate 21 by a bolt 51, as depicted in FIG. 5A. The housing plate 21 also rests upon a bearing 52 held between retainer ring 53 with cap screws 54 and retainer ring 55 with cap screws 56 which fasten in a pressure plate 58. Pressure plate 58 has an annular collar 59, which communicates via bushings 60 and 61 with bearing tube 28. The pressure plate 58 is therefore reciprocable over bearing tube 28, in response to movement of the pistons 49 and 50, and is also rotatable with the bearing tube 28 and drive shaft 15.

Movement of the pressure plate 58 is transferred to a belt ring holder 62 of inboard ply guide ring 13 by a plurality of shoulder bolts 63. Springs 64 encircle the bolts 63 and are employed to allow the belt ring holder 62 to ride with the inboard side ring 32 and related components rather than with the housing plate thereby giving flexibility to the inboard belt guide ply ring 13.

A radially outwardly directed flange 66 extends from the outer annular rim 68 of belt ring holder 62. A belt ply ring 69 rests upon rim 68 and is connected to the flange 66 with a plurality of nuts and bolts, 70 and 71. Belt ply ring 69 comprises a radial plate 72, terminating in a V-shaped rim 73 and an annular shelf 74 which carries a radially outwardly directed rim 75. Rims 73 and 75 are provided for the application of the belts, as will be hereinafter described. On the inner side of the radial plate 72, a sidewall register ring 76 is connected with bolts 77. A spacer 78 is provided between the flange 66 and plate 72 in order to locate the belt ply ring 69 correctly, relative to the tire carcass. By substituting the spacer 78 with one of different width, the belt ply ring 69 can be moved toward or away from the flange 66 along the rim 68.

The base of belt ring holder 62 is formed by a hub 79, the internal diameter of which is sufficient to clear a register nut 80 and the hub 81 of outer ring support member 82 of the drum 12. A seal collar 83 fits between the drive shaft 15 and hub 81, matingly engaging the threaded end of tube 28. The collar 83 abuts a drum spacer 84 (FIG. 4), employed to control the amount of drum contraction for expansion of the tire carcass. The outer ring support member 82 is formed by a plate 85 radially outwardly extending from the hub 81 and terminating in a bladder bead-gripping tip 86.

An annular drum register ring 88 is connected to the plate 85 with a plurality of bolts (not shown) and has a hub 89 which closely interfits with the hub 79 of belt ring holder 62, when the guide ring 13 and 14 close upon the drum 12 (FIG. 4). The inboard side ring 32 is connected to the ring 88, also with bolts (not shown). The side ring 32 extends above register ring 88 forming a bead seat 90. The register ring 88 forms the base of bead seat 90 and is machined for receipt of an air-activated bead clamp 91 communicable with an air passageway 92 provided in ring 88 and support member 82 and fed by a hose 93 (FIG. 4) leading to an air supply within the drive shaft 15.

Components of the outboard belt ply guide ring 14 and outboard half of the building drum 12 are generally similar to the inboard components just described. With reference to FIG. 3 it is seen that the ring 14 is movable against the drum 12 by a piston 95 from a pneumatic cylinder 96. The cylinder 96 is suitably mounted upon a bedplate 98 supported by a leg 99. The leg 99 can be connected with the frame 11 via longitudinally extending members 100.

The end of piston 95 is threaded for receipt of a piston rod end coupler 101 and a bearing 102 is held between the coupler 101 and a bearing housing 103. An engagement coupling 104 is fastened to the housing 103 and carries a bushing 105 frictionally engageable with the drive shaft 15 and rotatable therewith.

A flange 106 extends radially outwardly from the housing 103 which carries a plurality of shoulder bolts 108 received by a belt ring holder 109. Spacers 110 and springs 111 encircle each bolt 108, the springs functioning in the same manner as springs 64, allowing the belt ring holder 109 to ride with the outboard side ring 33 and giving flexibility to the outboard belt guide ply ring 14. A radially outwardly directed flange 112 extends from the outer annular rim 113 of belt ring holder 109. A belt ply ring 114 rests upon rim 113 and is connected to the flange 112 with nuts and bolts 115, 116 and interchangable spacer 117. Belt ply ring 114 comprises a radial plate 118, terminating in a V-shaped rim 119, and an annular shelf 120 which carries a radially outwardly directed rim 121, the rims 119 and 121 being provided for the application of the belts. On the inner side of the radial plate 118, a sidewall register ring 122 is connected with bolts 123. The base of belt ring holder 109 is formed by a hub 124, which passes over the drive shaft 15, a small register nut 125 thereon and the hub 126 of outer ring support member 128 of the drum 12. The nut 125 secures the ring support member 128 to the drive shaft 15.

The ring support member 128 is formed by a plate 129 extending radially outwardly from the hub 126 and terminating in a bladder bead-gripping tip 130. An annular drum register ring 131 is connected to the plate 129 with a plurality of bolts (not shown) and has a hub 132 which closely interfits with the hub 124 of belt ring holder 109, when the belt guide ply rings 13 and 14 close upon the drum 12 (FIG. 4). The outboard side ring 33 is connected to the ring 131, also with bolts (not shown). The side ring 33 extends above register ring 131 forming a bead seat 134. The register ring 131 forms the base of bead seat 134 and is machined for receipt of an air-activated bead clamp 135 communicable with an air passageway 136 provided in ring 131 and support member 128. Passageway 136 is fed air via a supply line 137 which is connected to the air supply within the drive shaft 15 which also feeds the hose 93.

The movement of the drum 12 and belt ply guide rings 13 and 14 to the contracted position, for the application of belts to the tire carcass, will now be described. In FIG. 1, both guide rings 13 and 14 have been retracted and the assembly 10 is in an open position. An air bladder or membrane 138 is positioned between outer ring supports 82 and 128 and drum register rings 88 and 131 (FIGS. 5A and 5B respectively) and is subsequently inflated by compressed air passing from an inner air line 139, passing through the drive shaft 15, through ports 140 in the drive shaft and 141 in the drum spacer 84 respectively to create a toroidal-shaped cavity 142. As depicted in FIG. 1, the bladder 138 is collapsed on the drum 12 as a result of subatmospheric pressure being fed through the ports 140 and 141. In this position a tire carcass, built on a first stage tire building drum such as described in my aforesaid copending application, Ser. No. 970,570 can be readily slipped over outboard side ring 33 and centered on drum 12.

In FIG. 2, the pistons 31 from hydraulic cylinders 30 have been extended, advancing the inboard components of drum 12, i.e., outer ring support 82, drum register ring 88 and side ring 32 toward the corresponding outboard components of drum 12. Slight air pressure, on the order of 1–10 psi (0.07–0.7 Kg/cm$^2$), is first supplied to the bladder partially to inflate it and the carcass in order to facilitate positioning of the beads on the bead seats 90 and 134. With reference to FIG. 4, a typical tire carcass generally 143, is depicted comprising left and right beads, 144 and 145 respectively, the body plies 146 and left and right sidewall strips, 148 and 149 respectively. Sidewall strips 148 and 149 were applied during first stage assembly of the carcass 143. In order to prohibit the complete adhesion between the strips 148 and 149, on the sides of carcass 143, thin plastic film (not shown) were interposed therebetween. Now, as the carcass 143 is approaching its toroidal shape, the plastic film are removed, the sidewall strips 148 and 149 falling away from the carcass 143, as depicted in FIG. 4.

Following removal of the plastic film, higher air pressure, on the order of 8 to 40 psi (0.56 to 2.8 kg/cm$^2$) is introduced so as to expand the tire carcass fully. It will be noted that during carcass shaping the left bead 144 is held radially by unexpanded clamp 135 and the right bead 145 by unexpanded clamp 91 and laterally by the sidewalls of the bead seats 134 and 90 and the bladder 138.

The bladder 138 can be a totally elastomeric membrane or it can be reinforced with various filaments, conventionally employed in tire ply fabrics, including helically coiled steel wire described in U.S. Pat. No. 3,778,329, owned by The Steelastic Co., the Assignee of record herein. Although a bladder 138 is employed in the embodiment described herein, the carcass could be inflated directly with air, thereby eliminating the bladder, the air pressure within cavity 142 being sufficient to hold the beads 144 and 145 on the respective shelves 134 and 90. Alternatively, a perforated bladder could be employed which would support the carcass 143 upon the drum 12 in its cylindrical shape. Once mounting of the carcass was complete, air pressure passing through the perforated bladder would inflate the carcass for application of the belts as otherwise described herein.

As further depicted in FIG. 4, outward expansion of the sidewall strips 148 and 149, as well as the sides of the carcass body plies 146, is controlled by respective sidewall register rings 122 and 76. The register rings help to align the upper portion of the carcass 143 depicted in FIG. 4 with the drum centerline.

The upper sides of the carcass 143 are further shaped by the inclined undersurfaces 150 and 151 of the annular shelves 120 and 74, respectively. While the lower portion of the sidewall strips 148 and 149 adheres to the carcass body plies 146, the upper portion is maintained free at this stage, having been formerly separated therefrom by the thin plastic film which was removed during initial inflation of the carcass. The upper portion of sidewall strips 148 will rest above sidewall strips register ring 122 in a cavity 152 beneath the shelf 120 while the upper portion of sidewall 149 similarly rests within a cavity 153 above sidewall register ring 76.

To arrive at the closed position depicted in FIG. 4 the pistons 49 and 50, from respective cylinders 22 and 23 (FIG. 3) have extended the inboard belt guide ply ring 13 into the closed position against the drum 12, the position being determined by contact between the end of drum spacer 84 and seal collar 83 and the engagement of belt ring holder hub 79 with drum register ring hub 88. Simultaneously, the piston 95 from the outboard pneumatic cylinder extends the outboard belt guide ply ring 14 into the closed position against the drum 12 wherein the engagement coupling 104 abuts the small register nut 125 and belt ring holder hub 124 engages the drum register ring hub 132.

When this closed position is achieved the air pressure within the cavity 142 may be momentarily decreased at which time air pressure is introduced through the line 137 to the bead clamp 135 exerting a radial pressure on the bead 144 which is resisted by the circumferential rigidity and stiffness of the bead. The right bead 145 is similarly held, laterally between the sidewalls of side rings 33 and the bladder 138, and by the radially directed force exerted by pressurized bead clamp 91 against the bead. This clamping action effectively removes clearance between the carcass beads and drum bead seats which had been essential during shaping of the carcass from cylindrical to toroidal to permit rotation of ply materials around the beads. The bead clamps are designed to accurately register the carcass beads 144 and 145 concentric with the drum register rings 89 and 132. When the beads are firmly registered, air pressure within the cavity 142 is restored to the specified pressure. While the foregoing procedure is preferred, in some embodiments it may be preferable not to momentarily decrease the air pressure in the cavity 142 when the bead clamps are pressurized.

At this point the belts are applied. The first belt 154, is applied directly between the rims 121 and 75 of belt guide ply rings 14 and 13. The rims being spaced apart the precise width of the belt 154, being equidistant from the centerline B, and being of high flange design, the belt 154 is unable to climb over either rim and thus is accurately positioned upon the carcass 143 with no possibility of misalignment. Height of the rims 121 and 75 is preferably about four times the combined thickness of the belt 154 and a second belt 155.

The second belt 155 is subsequently applied over belt 154. The edges of belt 155, as depicted, have had their lateral edges gum edged wherein a thin ribbon of elastomeric material 156 and 158 is provided to each edge of the belt. The gum edge applied can be of sufficient dimension to extend the belt width to that of belt 154. Alternatively, the edged belt 155 can be of lesser width and still be properly aligned by visually determining an equal space from both rims 121 and 75. Suitable apparatus for such gum edging operations is described in U.S. Pat. No. 4,090,835, owned by The Steelastic Company, the Assignee of record herein, but which does not form any part of the present invention.

The purpose of the V-shaped rims 73 and 119 is as a track for a belt feeding tray assembly (not shown) which could be employed for the operator from which to withdraw belt material. The tray assembly would have wheels or other suitable registering device to engage the rims 73 and 119 which would revolve as the drum 12 and belt guide ply rings 13 and 14 rotated during belt application and cause the ply guide tray to follow any unavoidable lateral movement of the drum and tire carcass. The tray would subsequently be withdrawn for separation of the belt guide ply rings 13 and 14 from the drum 12.

After the belts 154 and 155 have been applied to the carcass, they are stitched with conventional roller stitching equipment generally 159 (FIG. 3), to the carcass 143 in the space between the annular shelves 74 and 120. As soon as stitching has commenced, the belt guide ply rings 13 and 14 can be withdrawn, so the belts can be stitched to the carcass across their total width. Then, the tread stock (not shown) can be applied and stitched down, and the sidewalls 148 and 149 stitched over the edges of the tread. It is to be understood that the drum 12 and belt guide ply rings 13 and 14 will be rotated by the drive shaft 15 during application and stitching operations which can be controlled by a foot pedal or other suitable means (not shown). Although the stitching can be carried out by hand, a suitable mechanical stitching apparatus can be readily employed with the assembly 10. While only hand stitching has been depicted, it is to be understood that the invention disclosed herein is not to be limited solely to such means.

Finally, with stitching complete and the belt guide ply rings 13 and 14 withdrawn, the cavity 142 is deflated subatmospheric pressure being applied to the bladder, if necessary, and the carcass can be removed for curing. As should now be understood, the second stage building of a radial tire is readily and accurately achieved. Because the beads are firmly and accurately fixed on the drum, after expansion to the toroidal shape, and the belt guide ply rings are centered over the carcass for the application of the belts, and the assembly has not been made easily adjustable for building a variety of tire sizes, not only is the construction and operation of the assembly simplified with attendant cost savings, but also, the quality and cost of the product built on this assembly is improved.

Thus, it can be seen that the disclosed invention carries out the objects of the invention set forth hereinabove. As will be apparent to those skilled in the art, the application of belts or similar elements to radial tire carcasses and other products similarly constructed, can be facilitated with the second stage building drum assembly herein disclosed and described, the scope of the invention being limited solely by the scope of the attached claims.

I claim:

1. A second stage building drum assembly mounted for the application of belts and the like to a tire carcass, comprising:

a drive shaft;

a first ring support member secured to said drive shaft;

a second ring support member carried on said shaft and movable longitudinally thereon;

a drum spacer interposed between said first and second ring support members;

a drum supported between said first and second ring support members;

means to move said second ring support member longitudinally away from said first ring support member to dispose said drum in cylindroidal configuration for mounting and removing a tire carcass;

means to move said second ring support member longitudinally toward said first ring support member, as limited by the interposition of said drum spacer, toroidally to shape a tire carcass mounted thereon.

2. A second stage tire building drum assembly, as set forth in claim 1, further comprising:

means forming a first bead seat movable with said first ring support, for receiving a carcass bead; and means forming a second bead seat connected to said second ring support, for receiving a carcass bead.

3. A second stage tire building drum assembly, as set forth in claim 2, further comprising:

a drum register ring supported from each said ring support member;

a locating hub presented from each drum register ring;

first and second belt guide ply rings movable longitudinally with respect to said shaft;

a hub on each said belt guide ply ring;

the hubs on said guide ply rings engaging the corresponding hubs on said bladder means register rings accurately to locate said belt guide ply rings with respect to said drum when said ring support members engage the interposed bladder means spacer.

4. A second stage tire building drum assembly, as set forth in claim 3, in which the belt ply guide rings further comprise:

a belt ring holder secured to each said hub;

a circumferential shelf supported from each said belt ring holder, said shelves extending longitudinally from the belt ring holders in facing opposition partially to overlie a toroidally shaped carcass mounted on the drum when said hubs are engaged.

5. A second stage tire building drum assembly, as set forth in claim 4, further comprising:

a rim extending radially from each said circumferential shelf, said rims being selectively positioned to determine the location for components to be applied to the toroidally shaped tire located therebetween.

6. A second stage tire building drum assembly, as set forth in claim 5, further comprising:

a radial plate;

said shelf being secured to said radial plate;

connecting means selectively to secure said radial plate to said ring holder;

spacer means adapted to be interposed between said radial plate and said ring holder by which selectively to predetermine the lateral dimensions between said rims.

7. A second stage tire building drum assembly, as set forth in claim 4, further comprising:

a side ring secured to each drum register ring;

said side ring extending radially outwardly of said drum register ring to cooperate therewith in forming the base and sidewall of the bead seat; and, a bead clamp supported in said drum register ring and operable through the base wall of the bead seat.

* * * * *

UNITED STATES PATENT AND TRADEMARK OFFICE
CERTIFICATE OF CORRECTION

PATENT NO. : 4,269,649
DATED : May 26, 1981
INVENTOR(S) : Robert S. Vanderzee

It is certified that error appears in the above-identified patent and that said Letters Patent are hereby corrected as shown below:

Column 9, line 7, "drum" should be deleted and insert --bladder means--; line 11, "drum" should be deleted and insert --bladder means--; line 37, "bladder means" should be deleted and insert --drum--.

Signed and Sealed this

Twenty-ninth Day of December 1981

[SEAL]

Attest:

GERALD J. MOSSINGHOFF

Attesting Officer

Commissioner of Patents and Trademarks